(No Model.) 4 Sheets—Sheet 1.

J. R. RUDE & H. G. SWOPE.
GRAIN DRILL.

No. 274,662. Patented Mar. 27, 1883.

WITNESSES
Franck L. Ourand
J. Heylmun

INVENTORS.
J. R. Rude,
H. G. Swope,
by Heylmun & Kane
ATTORNEYS.

(No Model.)  4 Sheets—Sheet 3.

J. R. RUDE & H. G. SWOPE.
GRAIN DRILL.

No. 274,662.  Patented Mar. 27, 1883.

Witnesses
Franck L. Ourand
J. Heylmun

Inventors,
J. R. Rude.
H. G. Swope.
by Heylmun & Kane
Attorneys.

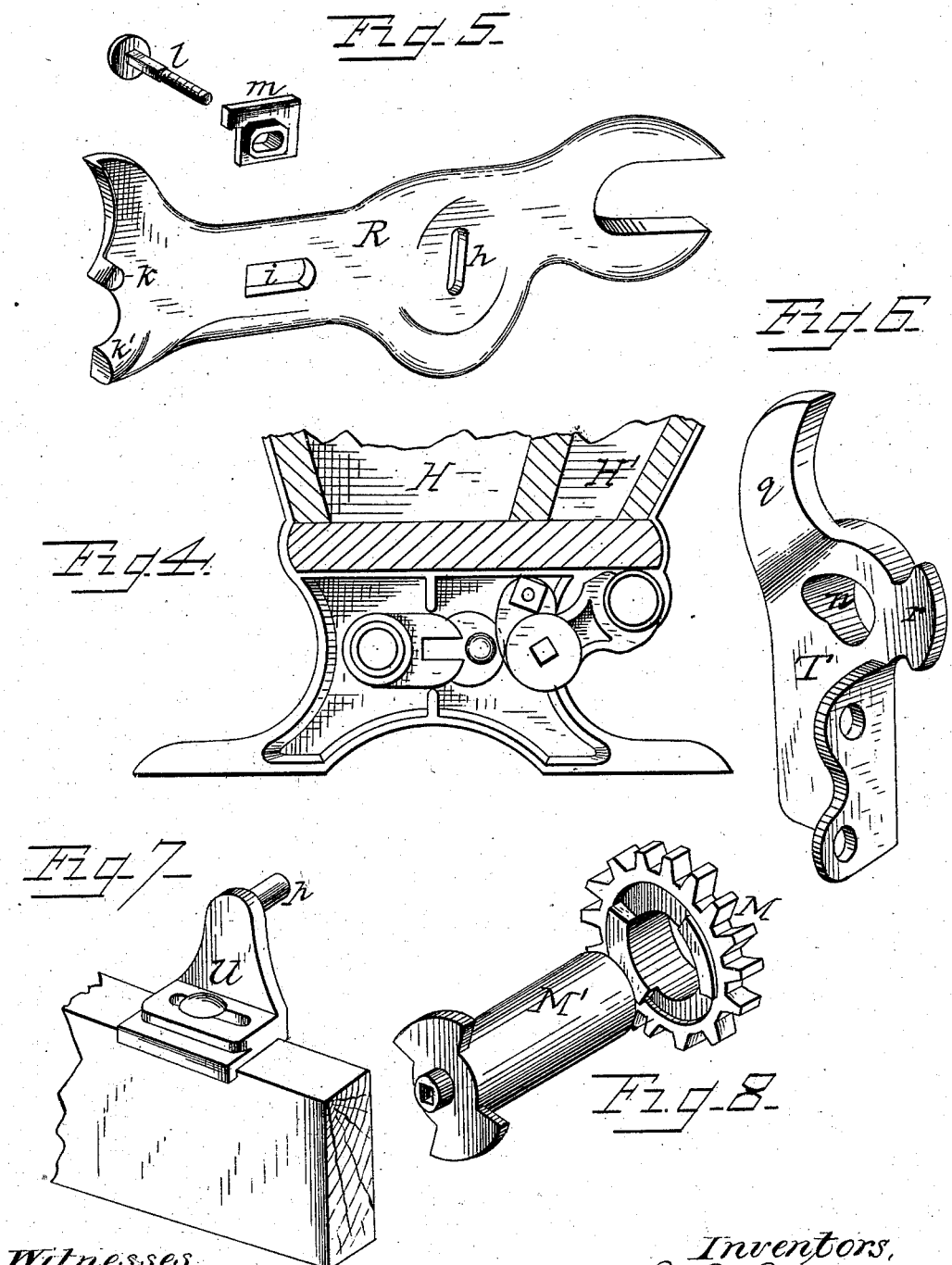

UNITED STATES PATENT OFFICE.

JOHN R. RUDE AND HORACE G. SWOPE, OF LIBERTY, INDIANA.

GRAIN-DRILL.

SPECIFICATION forming part of Letters Patent No. 274,662, dated March 27, 1883.

Application filed July 8, 1882. (No model.)

*To all whom it may concern:*

Be it known that we, JOHN R. RUDE and HORACE G. SWOPE, citizens of the United States of America, residing at Liberty, in the county of Union and State of Indiana, have invented certain new and useful Improvements in Grain-Drills; and we do hereby declare the following to be a full, clear, and exact description of the invention, such as will enable others skilled in the art to which it appertains to make and use the same.

This invention relates to that class of grain-drills which are provided with a hopper for grain, a hopper for grass-seed, with or without a hopper for fertilizer, and mechanism for feeding the grain and grass seed; and the main objects of the present invention are to improve the means for operating and adjusting the actuating mechanism and the detail construction of the frame.

Figure 1:
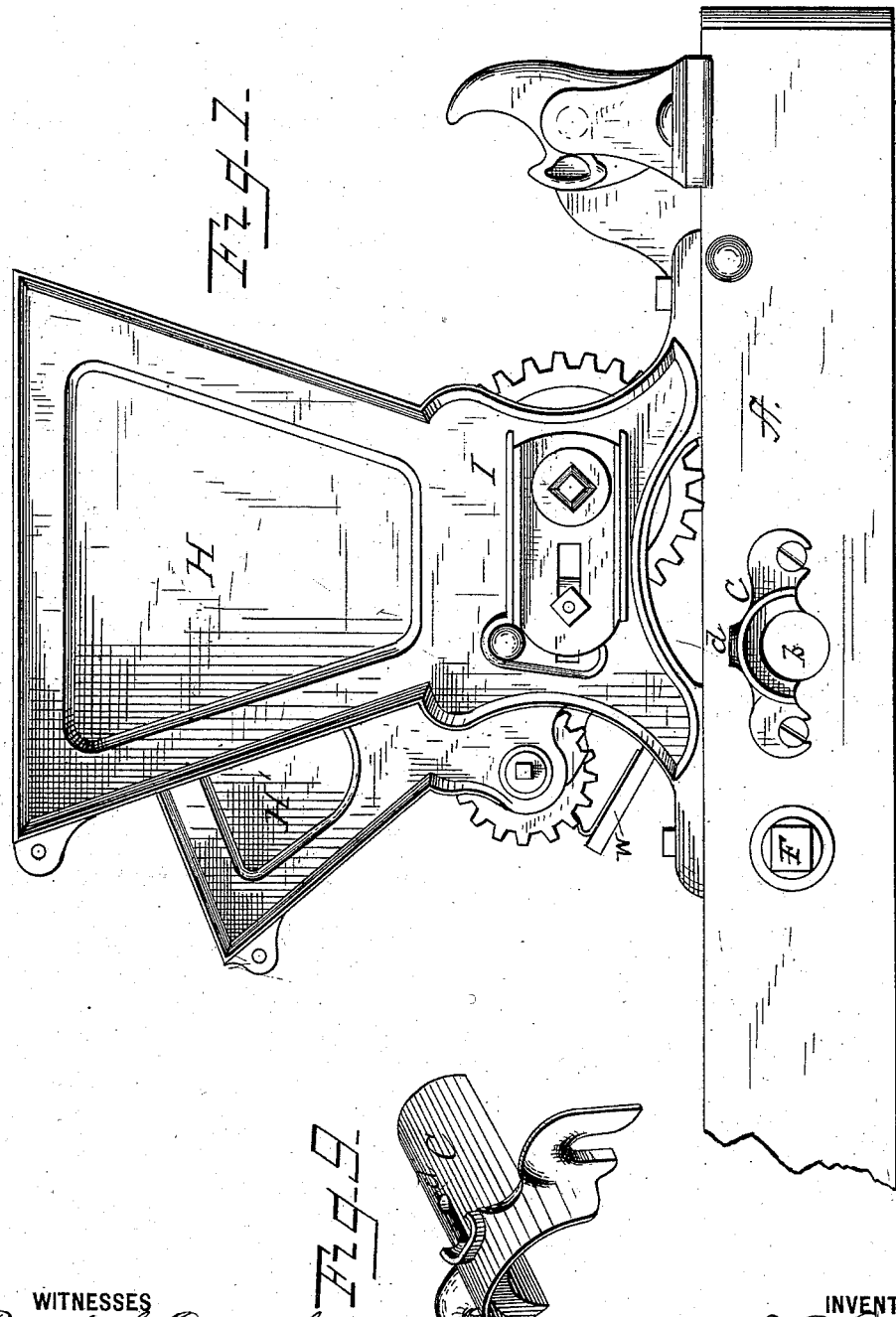
Figure 2:
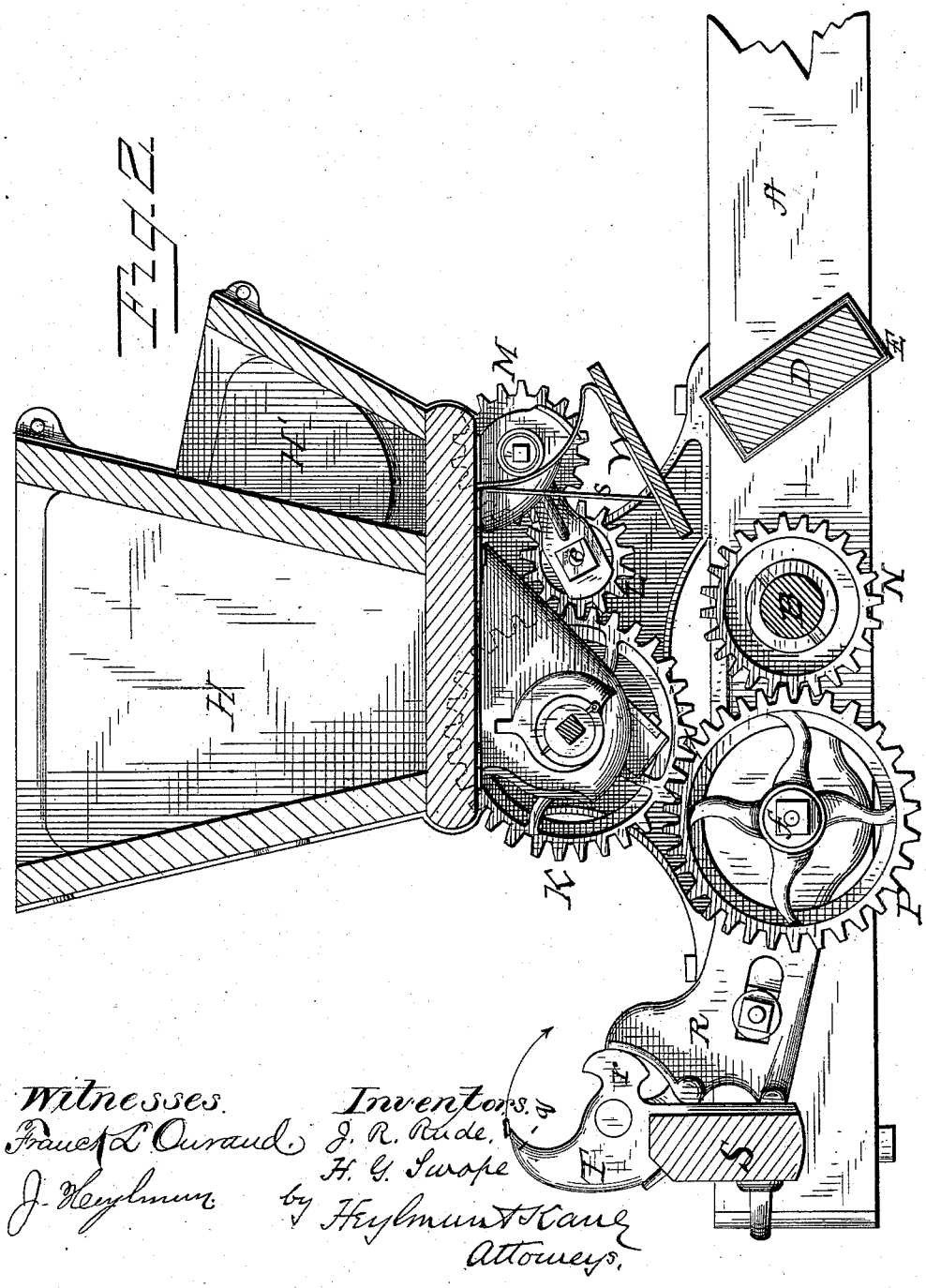
Figure 3:
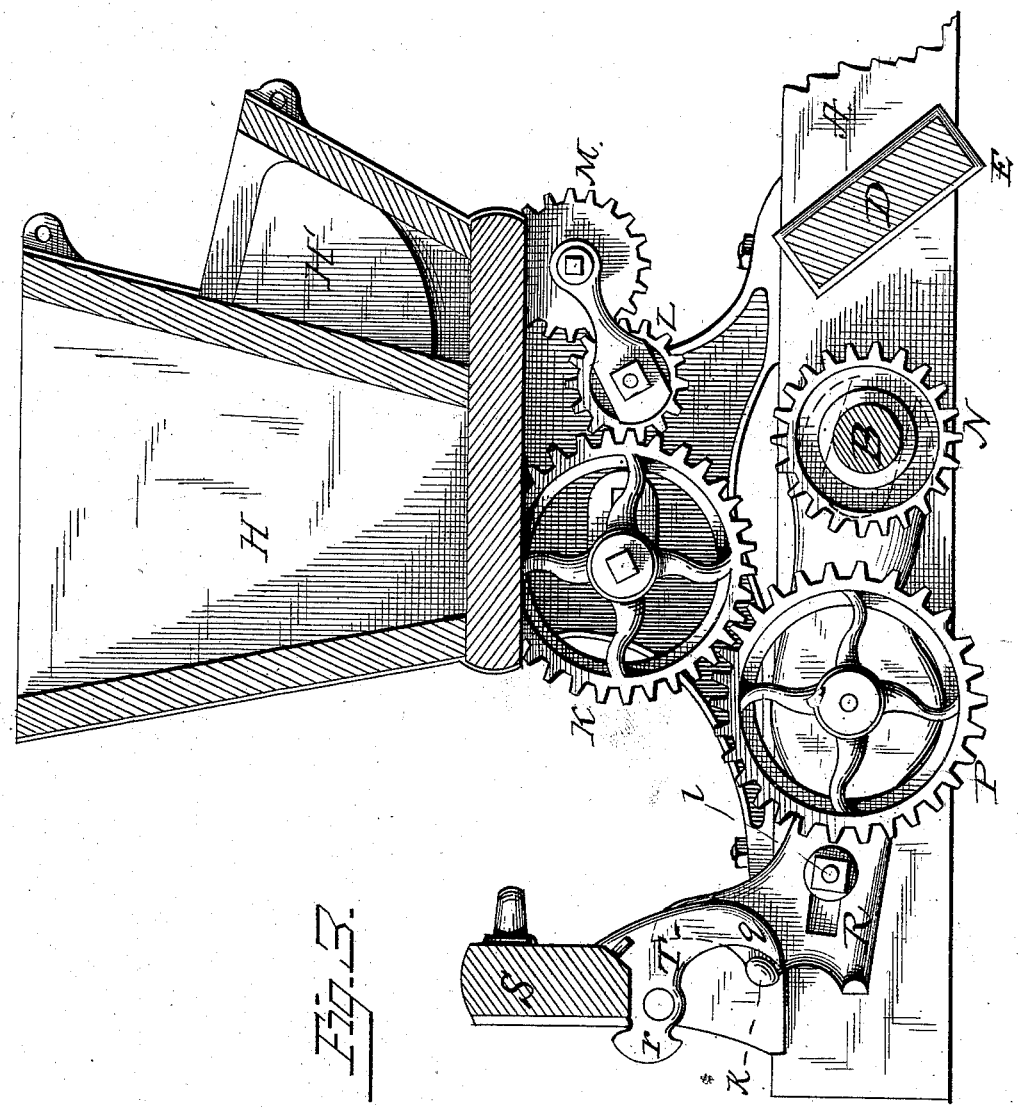

In the annexed drawings, Figure 1 is a side view of the rear portion of a grain-drill frame, showing our improvements applied thereto. Fig. 2 is a longitudinal sectional view of the rear portion of a grain drill and hoppers with seed-cups, showing the shifting means and gearing engaged for operation. Fig. 3 is a sectional view, like that of Fig. 2, with the seed-cups omitted, showing the shifting means shifted and the gearing disconnected from the gear of the driving-wheel. Fig. 4 is a side view of the standard for the gearing and hoppers. Fig. 5 is a perspective view of the jack-plate. Fig. 6 is a perspective view of the lifting-rail bracket for actuating the jack-plate. Fig. 7 is a perspective view of the journal-bearing for the lifting-rail bracket. Fig. 8 is a perspective view of a gear-wheel and bearing with clutch-connection, and Fig. 9 is a perspective view of the axle-bearing.

The letter A represents one of the side bars or beams of the frame of a grain-drill, having near its rear end a transverse opening, $b$, for the passage of the axle B, upon which the supporting-wheels are attached. Within this opening, at the upper portion, is arranged a crescent-shape or semicircular bearing, C, with an oil-passage, $d$, for lubricating the journal-bearing of the axle. The office of this bearing C, which rests directly upon the axle-bearing, is to receive the wear and reduce the friction.

In front of the gearing is arranged the transverse connecting-rail D, the ends of which are fitted into iron sockets E, arranged at an angle, substantially as shown in Figs. 2 and 3 of the drawings. These metal sockets at each end of the cross-rail D are formed with a central hole for the passage of a connecting-bolt and a plurality of pins or dowels (not shown) adapted to be driven into the inner face of the side bars of the frame to prevent the same from working on a center. The cross-rail, which has bored into its ends holes for the reception of the side fastening-bolts, is connected or secured to the side bars by the side bolts, F, (one on each side,) passing through the bolt-holes in the side bars, the bolt-holes in the sockets, and into the bolt-passages in the cross-rail, where they meet nuts, (let therein by means of suitable apertures,) and are secured thereby. This method of fastening the cross-rail obviates the necessity of dovetailing, mortising, or tenoning, greatly strengthens the frame, and prevents the side bars from warping or twisting and binding the gearing.

The letters H H' represent the grain and grass seed hoppers respectively, secured to the end standards, I, and mounted upon the frame. A hopper for fertilizer may be attached in front or rear of these hoppers, as circumstances may require.

To the bottom or under side of the grain and grass seed hoppers (see Fig. 2) are attached the grain and grass seed cups with their feed means mounted upon separate and independent shafts.

Upon a sleeve on the shaft that actuates the feed device of the grain-seed cup is loosely arranged a gear-wheel, K, which meshes into an intermediate pinion, L, mounted loosely on a bearing, $e$, and engaging with the gear-wheel M, mounted on the sleeve M' on the shaft actuating the feed device in the grass-seed cup.

To the main axle B is secured a gear-wheel, N, engaging with the intermediate gear-wheel, P, having its journal bearing on a bolt, $f$, passing through the vertical slot $h$ of the jack-plate R, and this latter intermediate gear-wheel, P, engages with the gear-wheel K, as shown in Fig. 2 of the drawings.

The jack-plate R (see Figs. 3 and 5) is constructed at its inner end with fork-prongs to straddle the axle carrying the supporting-wheels to secure an additional support and guiding means, the vertical slot $h$ for the passage and adjustment of the headed bolt that receives the intermediate gear-wheel, P, the diagonal or horizontal slot $i$ to allow for the backward and forward movements of the plate, and the rear curved end with inward projections or lugs $k$ $k'$, for engagement with the shifting-bracket on the lifting-rail hereinafter described. The jack-plate is connected to the side bar of the frame by the bolt $l$ passing through the side bar and flanged washer $m$, arranged in the slot $i$ of the said plate. As already stated, this jack-plate carries the intermediate gear-wheel, P, and has an inward and outward adjustment to engage the said gear with the gear N, secured on the main axle B.

The gear-wheels P, K, L, and M work on sleeves; but the gear M and sleeve M' are provided with clutch means to make a firm connection, as indicated in Fig. 8 of the drawings. The letter S represents the lifting-rail, to which the elevating-chains of the hoes are connected. This lifting-rail at one end is provided with a cam bracket or arm, T, substantially of the construction seen in Fig. 6 of the drawings. The cam bracket or arm, having the function of a shifting device, is formed with screw-holes in the side flange for the fastening-screws, an opening, $n$, to fit over the journal-bearing $p$ of the adjustable bracket U, attached to the upper surface of the side bar, the curved finger $q$ for engaging with the lug or pin $k$ of the jack-plate R, and the cam-surface $r$ for engaging with the curved end of the jack-plate, as seen in Figs. 1, 2, and 3 of the drawings.

The letter W represents what is termed a "seed-board," suspended by suitable means at an angle from the bottom of the grass-seed hopper, immediately under the discharge-orifice of the grass-seed cup, as seen in Fig. 2 of the drawings. This seed-board is provided with slotted arms or rods $s$, for adjusting the said board to the discharge ends of the grass-seed cups, so as to receive the delivered seed and chute the same by the incline plane of the seed-board to the rear of the drill and cause it to fall behind the hoes in a scattered condition. When it is desired to deliver the grass-seed in front of the hoes the seed-board is adjusted out of the way, and the grass-seed, delivered from their cups, will fall upon the upper inclined surface of the cross-rail D and chute the same in a scattered condition.

By reference to Fig. 1 it will be seen that all the gearing is placed on the inside of the side rail or bar—that is to say, within the inclosure of the frame—so as to be protected from mud, dust, &c., that is usually carried up by the transporting-wheels, and also obviates the use of casing for the gearing; also, by means of the slots and adjusting means shown, fast or slow motion gearing can be employed.

From the foregoing description and reference to Figs. 2 and 3 of the drawings it will be observed that when the hoes are down the intermediate gear-wheel, P, is engaged with the gear-wheel N on the axle, and the machine is feeding the grain and grass seed to the earth. When the hoes are to be raised or unearthed the driver, by the ordinary lever, (not shown,) throws the lifting-rail S upward, which causes the finger $q$ of the cam-arm T to strike the pin $k$ of the jack-plate R for an engagement, and by a further revolution of the rail with its attachments the jack-plate is moved outward or rearward, carrying therewith the intermediate gear-wheel, P, thus disengaging the gear-wheels N and P, as shown in Fig. 3 of the drawings. This disengagement stops the feed of the grain and grass seed for the time being. When the driver lowers the hoes again that portion of the cam-bracket which held the jack-plate by means of the pin $k$ is withdrawn, and in the part revolution which the cam-bracket makes in returning to its normal position the cam-surface $r$ strikes the curved end of the jack-plate and again forces the jack-plate, with its gear, inward or forward, thereby engaging the wheels again for the operation.

The gearing L and M, for operating the grass-seed wheels, are connected and maintained in a relative position by means of the connecting link or strap, as shown. By this arrangement of all the gearing on the inside of the frame we dispense with the iron casing or covering for gearing, and at the same time protect the same from mud, trash, &c., carried up by the transporting-wheels.

We are aware that seed-boards have heretofore been combined with seed-feeding means; but the construction and arrangement of these seed-boards are entirely different from that herein set forth.

We reserve the right to vary the construction and arrangement of parts without departing from the spirit of the invention.

What we claim as our invention, and desire to secure by Letters Patent, is—

1. In a grain-drill, the combination, with a grass-seed cup, of a suspended seed-board adjustably attached to the bottom of the seed-hopper, and arranged at an angle for conducting the discharged grass-seed rearwardly, substantially as described.

2. In a grain-drill, a jack-plate slotted both longitudinally and vertically, working on an axis, and having its inner end forked and resting on or straddling the main axle, by which it is supported and guided in its inward and outward movements, substantially as described.

3. In a grain-drill, a slotted jack-plate R, formed at its inner end with the forked prongs, the vertical slot $h$, and horizontal slot $i$, and the rear curved end formed with pin $k$, substantially as described.

4. In a grain-drill, a shifting device attached to a lifting-rail, consisting of the cam bracket or arm provided with the finger $q$, and cam-surface $r$, substantially as shown in Fig. 6 of the drawings.

In testimony whereof we affix our signatures in presence of two witnesses.

JOHN R. RUDE.
HORACE G. SWOPE.

Witnesses:
D. H. BOYER,
W. A. SIGLER.